United States Patent [19]

Breton et al.

[11] 3,997,447
[45] Dec. 14, 1976

[54] FLUID PROCESSING APPARATUS

[75] Inventors: Ernest J. Breton, Wilmington; Dexter Worden, Newark, both of Del.

[73] Assignee: Composite Sciences, Inc., Newport, Del.

[22] Filed: June 7, 1974

[21] Appl. No.: 477,490

[52] U.S. Cl. ............................ 210/360 A; 210/77; 210/82; 210/366; 210/393; 210/412; 210/503
[51] Int. Cl.² ...................................... B01D 33/24
[58] Field of Search ............. 210/77, 82, 107, 108, 210/360 A, 365, 366, 380, 391, 393, 412, 503, 504, 506, 331

[56] References Cited

UNITED STATES PATENTS

| | | | |
|---|---|---|---|
| 1,117,601 | 11/1914 | Porter | 210/503 |
| 2,297,248 | 9/1942 | Rudolph | 210/504 X |
| 3,137,652 | 6/1964 | Grave | 210/331 |
| 3,187,898 | 6/1965 | Baker | 210/331 |
| 3,190,449 | 6/1965 | Muller | 210/107 X |
| 3,437,208 | 4/1969 | Kaspar et al. | 210/360 A |
| 3,515,605 | 6/1970 | La Botz | 210/506 X |
| 3,617,543 | 11/1971 | Smith | 210/77 X |
| 3,618,767 | 11/1971 | Thummel | 210/77 |
| 3,630,360 | 12/1971 | Davis et al. | 210/82 |
| 3,862,036 | 1/1975 | Simmons | 210/412 X |

FOREIGN PATENTS OR APPLICATIONS 617,677 2/1949 United Kingdom ............... 210/331

*Primary Examiner*—Charles N. Hart
*Assistant Examiner*—Robert G. Mukai
*Attorney, Agent, or Firm*—Connolly and Hutz

[57] ABSTRACT

Described are fluid processing devices primarily intended for filtration but which devices may also be used for dispensing or sparging liquids and gases into a body of fluid medium. According to the method of using the disclosed devices, fluid medium to be filtered is caused to flow over the active filtering surfaces of a filter medium, such as by rotating the filter element in the fluid medium, while the fluid medium is simultaneously caused to pass through the filter element. At predetermined intervals the fluid medium flow through the filter is reversed or backpulsed.

Also disclosed are porous elements of laminated structure in propeller or disc configurations which may be coated with microporous active surfaces to permit filtration of extremely small sized particles from a fluid medium or dispensing of extremely small sized bubbles of gas or droplets of liquid into a body of fluid medium.

10 Claims, 10 Drawing Figures

U.S. Patent  Dec. 14, 1976  3,997,447
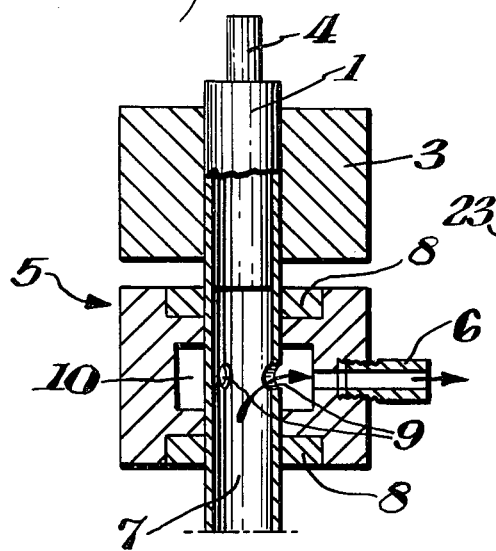
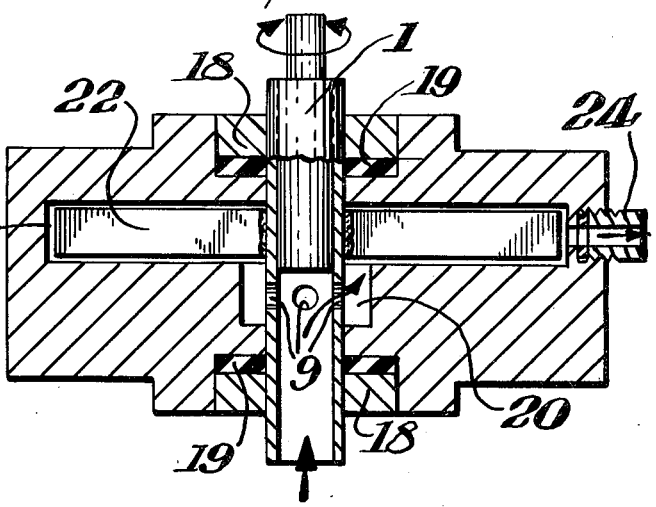
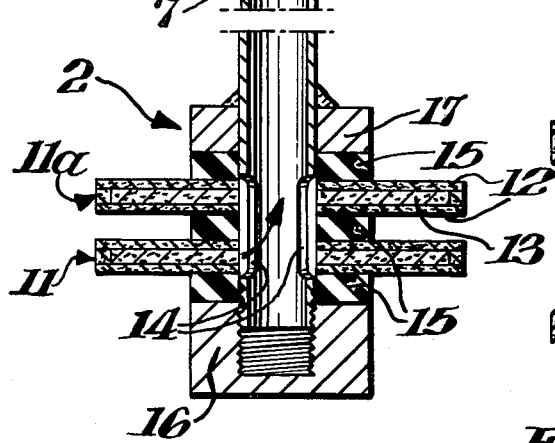
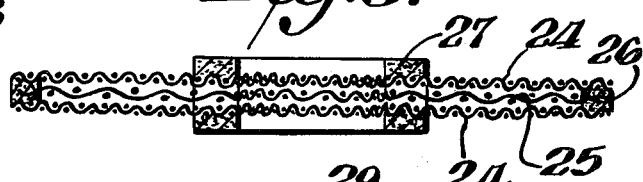
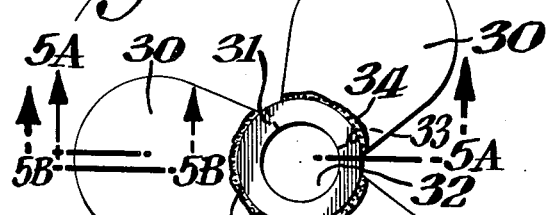
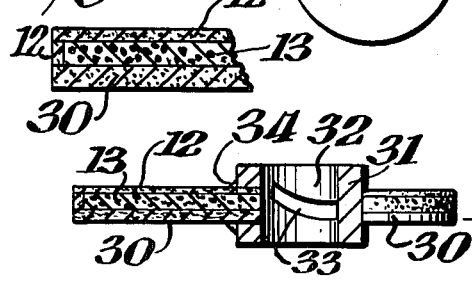
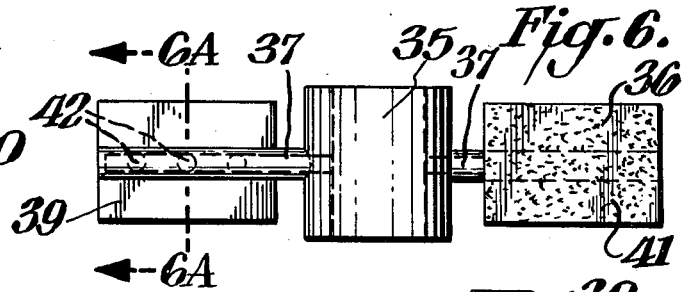
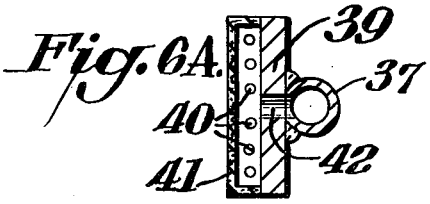

FLUID PROCESSING APPARATUS

STATE OF THE ART AND FIELD OF THE INVENTION

Rotating disc and drum filters having a fabric filtering medium have been previously suggested (e.g., U.S. Pat. No. 1,259,139). In these filters, a filtrate is continuously sucked through the rotating fabric filtering medium. Solids in the form of a cake build up on the filtering medium which is then rotated out of the liquid-solid mixture being filtered. The filter cake is mechanically removed from the filtering medium which is now in a position external to the mixture being filtered. The cleaned filtering medium is then rotated back into the mixture being filtered for another cycle. A rotating drum filter with a screen surface has been proposed (e.g., U.S. Pat. No. 3,788,470) for filtering relatively large particles.

In prior art filtration techniques, the filtering medium is cleaned for reuse by mechanical removal of solids as previously described or by backwashing. In backwashing, a liquid, usually water containing detergents or a suitable solvent for the solids, is passed in a reverse direction through the filter to dislodge and remove solid particles from the pores of the filtering medium after the medium has become fully or partially plugged. This cleaning procedure necessitates taking the filtering medium out of operation, which is an inconvenience and an added expense. An apparatus for dissociating collected solids from a filtration membrane by pulsing is described in U.S. Pat. No. 3,794,169.

BRIEF DESCRIPTION OF THE INVENTION

The present invention relates to fluid processing devices, and it is primarily directed to filtration devices whereby essentially continuous filtration of even gelatinous precipitates can be accomplished without substantial reduction in filtration rates and without the need repeatedly to interrupt the filtration process to clean the filter medium or to dislodge filter cake collecting on the filter.

In its broadest aspects, applicants have discovered a novel device wherein filter medium is immersed in a body of fluid medium to be filtered and the fluid medium is caused to flow over the active surfaces of the filter medium, preferably by rotating the filter in the fluid. The filter medium is, for example, supported on a rotatable hollow shaft and rotated within the body to be filtered. The fluid medium to be filtered is simultaneously caused to pass through the rotating filter medium to the interior of the hollow shaft and out of the shaft to a collection point exterior of the body of fluid medium. At predetermined time intervals during this filtering operation and for a predetermined length of time, dependent, inter alia, upon the specific construction of the filter medium and the nature of the precipitant, the flow of fluid medium through the filter is reversed or backpulsed. The combination of backpulsing and flow over the active surfaces of the filter medium serves to maintain the filter medium essentially free of filter cake buildup and entrapped precipitant and to provide continuous and substantially constant filtering rates.

Another aspect of the present invention is a novel disc filter to be mounted upon a rotatable, hollow shaft. The disc filter of the present invention comprises at least one, and preferably two or more spaced apart, active filter elements projecting outwards from a central hub, each filter element lying in essentially the same plane and being essentially continuous around the hub. The filter elements are typically made of porous metal, plastic or ceramic and generally comprise relatively large active planar surfaces extending away from the hub, joined by relatively small edge surfaces. The relatively large active planar surfaces may have any suitable configuration with the hub preferably centrally located in the middle thereof but a circular configuration around the hub is preferred. The elements are mounted on the hub providing passage of fluid medium through the filter elements and into the interior of the hub. When mounted on the hollow shaft, the interior of the hub communicates with the interior of the shaft. Upon rotation of the disc filter of the present invention within a body of fluid medium to be filtered, fluid medium can be caused to pass through the filter medium, into the interior of the hollow shaft and, now essentially freed of precipitate, the filtered medium can be collected at a point outside of the body to be filtered.

A preferred embodiment of the disc filter just described comprises at least one filter element mounted on the hub wherein one of its relatively large active planar surfaces is spaced a predetermined and essentially constant distance from another planar surface projecting away from the hub and essentially coextensive with such active surface. The other planar surface may be the active surface of a second filter element or it may be of a solid non-porous element having a configuration similar to that of the filter element. The predetermined spacing referred to is so chosen that, during rotation, the resulting centrifugal force prevents particles of precipitant from entering the space between the planar surfaces, thereby preventing clogging and filter cake buildup.

Yet another embodiment of the present invention is a novel device which includes a thin layer of very small pore size on the outermost layer of a filter element. In this device a porous filter element is initially provided, preferably of metal, the pore size of which is, at its outermost layer, larger than required or desired for the contemplated filtering operation. The pores in the outer layer of this filter element are then partially filled and blocked, and the outer layer is coated with a fluid composition containing a metal salt or complex which can be converted in situ to the basic metal of the salt. The fluid composition is typically a slurry of the metal salt or complex and the pores are blocked and partially filled by simple coating and working in of the fluid composition but preferably by forcing the slurry at least partially into the pores by means of a pressure differential. Regardless of the method employed, the depth of penetration of fluid composition into the pores is determined by the desired thickness of the resulting small pore layer on the outer surface of the porous layer and within the pores, which thickness is generally quite small. The metal salt or complex is then converted in situ to the base metal typically by reduction with hydrogen or cracked ammonia while heating. This method provides a thin coating of very small pore size supported by the filter element, the large pores in the outer layer of the filter element being essentially blocked by the small pore coating.

Another aspect of the present invention is an alternative, although less preferred device which includes a small pore-sized outer layer on a porous filter element. In this embodiment a porous filter element (typically of metal, ceramic or plastic) is provided, the pores of which are larger than desired or required for the contemplated filtering operation. Over the outer surfaces of the filter element is placed a thin sheet or layer of porous or microporous material such as PTFE, polyethylene, polypropylene, polycarbonate, etc. The thin sheet is suitably adhered to and supported by the filter element and is so arranged that fluid medium to be filtered must pass through the adhered sheet of small pore size prior to passing through the filter element.

Throughout, the term "active surface" refers to that surface of the filter element which effects filtration, that is, the surface of the porous element having a pore size smaller than the particle size of the suspended matter to be removed from the fluid medium. Actual filtration, i.e., removal of suspended particles, may, of course, occur at the surface or within the porous filter element.

Yet another object of the present invention is a rotatable fluid processing device in the form of an impeller or propeller having at least one blade with an active porous sparging or dispersing surface. The impeller or propeller is mounted on a hollow shaft and rotated in a body of fluid medium. The plane of the sparging surface is pitched at an angle intermediate between the plane of rotation and the axis of rotation of the device and the fluid medium within the body provides a force against the sparging surface during rotation which has a component normal to the surface. During rotation, fluid medium (gas or liquid) is forced through the hollow shaft through the active sparging surface and into the body of fluid medium.

BRIEF DESCRIPTION OF THE DRAWINGS

FIG. 1 is a cross-sectional view in elevation illustrating the fluid processing apparatus of this invention;

FIG. 1A is a partially broken away side elevational view of the filtering element shown in FIG. 1;

FIG. 2 is a cross-sectional view in elevation illustrating an alternate pump assembly used in the embodiment of FIG. 1;

FIG. 3 is a cross-sectional view in elevation illustrating the construction of another filtering element of this invention;

FIG. 4 is an enlarged cross-sectional view illustrating the sintered structure of still another filtering element of this invention;

FIG. 5 is a top plan view of an impeller blade filter element of this invention;

FIG. 5A is a cross-sectional view taken along line 5A—5A of FIG. 5;

FIG. 5B is an enlarged cross-sectional view taken along line 5B—5B of FIG. 5;

FIG. 6 is a side elevational view of another impeller blade filter element of this invention; and FIG. 6A is a cross-sectional view taken along line 6A—6A of FIG. 6.

DETAILED DESCRIPTION OF THE INVENTION

The superior processing characteristics of the novel devices and processes of the present invention arise in part from their unique ability efficiently and effectively to subject fluids ingressing or egressing from a porous surface to high shear stresses. This desirable result is achieved primarily by moving the porous element of this invention with relation to the fluid environment in which it is immersed. This may be caused by rotating the porous element in the fluid medium and/or by immersing the porous element in a body of moving fluid medium such as within a pipe or conduit carrying the fluid medium.

The porous structures of the invention usually are constructed from powders which have been sized and formed into laminated sheets or plates of interconnected and communicating pores by power metallurgy techniques before fabrication into the said structures. These sheets or plates are usually made from metal powders; however, they can be made from any sinterable, particulate material and, where chemical resistance is necessary or desirable, ceramics such as alumina and glasses and sinterable plastics such as polytetrafluoroethylene (hereafter "PTFE") and polypropylene can be used. Alternatively, etched, foamed, or woven plastic or metal can be used to make the laminated porous filter elements. Hereafter the invention will be illustrated primarily by the use of metal powders it being understood that any sinterable material can be used in a like manner.

The devices and processes of this invention will first be illustrated with reference to the filtering mode of operation, it being clear that in the sparging or dispersing modes, the same device may be employed simply by reversing the direction of flow of fluid medium through the device.

The porous filter elements of this invention are generally composed of a laminated structure of two or more layers or sheets which comprise combinations of porous layers or combinations of porous and solid layers. The layers or sheets normally comprise relatively large planar surfaces joined by relatively small edge surfaces. At least one planar surface of each layer or sheet contacts and is bonded to a planar surface of another layer or sheet, but the pores in each layer or sheet are in open communication over a substantial portion of the interface of the contacting and bonded surfaces.

In the filter elements of the invention an interior layer of large pore size is provided which is designed as a supporting and collecting layer, with holes or pores or open areas therein large enough to permit ready passage of the fluid medium while supporting the smaller pore-size or processing layer. The surfaces of the interior supporting and collecting layer are bounded by the processing layer or by solid reinforcing layers so that passage of fluid medium between the inner supporting and collecting layer and the outside of the structure must be through the processing layer (i.e., bypassing of the processing layer is avoided). An exterior reinforcing layer such as solid metal may be employed to add strength to the filtering element although the solid metal layer is not limited to the exterior position. The size of pores in the processing and support layers is adjusted to meet specific requirements. The pores in the exterior or processing layer may be adjusted on the basis of the size of particles to be removed from the fluid being filtered and may vary from, for example, about 0.01 to about 500 microns. The pore size in the support layer is then adjusted primarily to reduce resistance to flow and may range, for example, from 20 to 1,000 microns or larger.

The principal embodiment of this invention comprises a novel method of high frequency reverse flow or backpulsing combined with rotation of the filter to achieve continuous filtration over an extended period of time even with gelatinous precipitates. The resulting periodic change in the fluid flow pattern at the boundary layer of the filter results in particles being swept away before they can collect, lodge, and compact on and in the filtering medium forming a cake which reduces the filtering rate or stops filtration entirely. When the boundary layer is in a state of laminar flow during the filtration cycle, the backpulse cycle throws the boundary layer towards and into a state of mixed or turbulent flow, depending upon the surface velocity and rate of backflow.

Backflow in this embodiment of the present invention is distinctly different in several respects from the prior practice of backwashing to clean filters. First, the backflow pulsation in the invention begins before any reduction in the rate of filtration occurs. In normal backwashing, backflow occurs after flow through the filter had decayed to 50% or less of initial flow rates. Second, the liquid used for backflow pulsation according to the invention is necessarily the filtrate; whereas, in normal backwashing, it is a cleaning fluid that is not the filtrate. Third, when utilizing the described backflow pulsation operation the filtering action is not interrupted for extended periods of time for cleaning by backwashing as was the prior practice. Fourth, in backflow pulsation particles being filtered from the fluid medium do not collect within the porous structure of the filter medium; whereas, in conventional backwashing, particles collect within pores and progressively reduce flow through the filter.

The frequency of reverse flow or backpulsing according to the invention, as determined from the decay of the rate of flow generally must be over 10 pulses per hour in combination with a surface velocity of fluid medium over the active filtering surface of over 5 feet per second. Preferably, it should be over 20 pulses per hour.

The ratio of forward flow (filtering) to reverse flow generally must be less than 100 to 1 and greater than 1.5 to 1. Most systems can be filtered with a ratio that falls between about 20 to 1 and 3 to 1. The frequency of backpulsing and ratio of forward flow to reverse flow depend, inter alia, upon the size of pores in the porous medium and the nature and size of particles being removed from the fluid medium. As the ratio of the diameter of particles to the diameter of pores decreases and approaches 1 and becomes less than 1, the frequency of backflushing must be increased and the ratio of forward flow to backflow decreased within the limits specified above.

The necessity of high frequency backflow to obtain continuous filtration depends to a certain extent upon the rheology of particles and the ratio of particle diameter to pore diameter. With rigid equiaxial particles, continuous operation can be obtained without backpulsing when the ratio is over 2 to 1 at surface velocities of over 5 feet per second. However, pliable, sticky precipitates such as heavy metal hydroxides require backpulsing at higher ratios.

One embodiment of the device of the present invention is illustrated in FIG. 1. The rotating member consists of shaft 1 and, attached to it, filtering assembly 2. Both alignment and support are provided by bearing 3. Connection 4 is attached to a drive motor (not shown) of the type well known in the art. Assembly 5 is a rotating manifold to establish a fluid path between external connection 6 and the hollow portion 7 of shaft 1. Fluid is confined within the manifold by seals 8. Ports 9 connect the interior 7 of the shaft 1 to annulus 10.

Filtering assembly 2 as shown comprises two active filter elements 11 and 11a which are of circular configuration and essentially the same size. The elements can be spaced apart a predetermined distance such that during rotation centrifugal force tends to prevent the particles from entering the space between the adjoining planar surfaces of the filter elements. If desired, one of the filter elements 11 and 11a can be replaced by an impervious element but under such circumstances the total area of filtering surface is reduced. Moreover, the non-opposing surfaces of the filter elements 11 and 11a may be solid, impervious reinforcing layers thereby causing all filtration to occur within the space between the two filter elements and maximizing the effect of centrifugal force in reducing filter cake buildup.

If desired, the filtering assembly of the invention may also consist of only one filter element 11 and such an assembly when operated in accord with the principles of this invention will avoid plugging and unacceptable reduction in flow rate. In addition to the disc configuration just described, other configurations are possible such as propellers and impellers composed of two or more blades or paddles (see, for example, FIG. 5).

The filtering elements 11 and 11a as shown in FIG. 1A are comprised of two outer processing layers 12, which serve as the filtering media, laminated between which is an inner supporting and collecting layer 13, which provides a low-resistance fluid path connecting the pores in the outer layer 12 to the inside of the shaft. Slots 14 are cut through the walls of the shaft in order to establish a fluid path between core layer 13 and the inside 7 of the hollow shaft. Gaskets 15 separate the filtering elements 11 and 11a. The filtering elements are clamped into place by the force of closed end nut 16 pressing against retainer ring 17, which is attached to the rotating shaft 1. During filtration, fluid under a pressure gradient enters pores in outer processing layer 12 while the shaft is rotating, passes into collection layer 13, and flows through slot 14 to the interior 7 of the hollow shaft 1. The pressure gradient forces fluid up the rotating shaft and out through ports 9 into annulus 10 and thence through external connection 6. While FIG. 1 shows the rotating manifold and bearing assemblies as separate units, they may be combined.

In order to create a pressure gradient across the filtering elements, reduced pressure must be applied to external connection 6. This can be accomplished by the use of pumps of the type well known in the art. The pump can advantageously be combined with the rotary filter by the means shown in FIG. 2. This represents an assembly of the rotating manifold, the pump, and bearing supports. Not shown is the filtering element assembly such as that shown in FIG. 1. Bearings 18 support the rotating shaft 1. They are isolated from the fluid by seals 19. Annulus 20 and ports 9 comprise the rotating manifold. Pumping action is created by impeller 22 rotating within cavity 23. The pump impeller 22 has to be of a greater diameter than that of the filtering elements. In operation, the rotating impeller 22 forces liquid out of external connection 24 and draws fluid out of annulus 20. This, in turn, creates a negative pressure inside the hollow shaft. This action results in fluid's flowing in through the filtering element (not shown) and out through the ports 21 into the annulus 20 which connects to the pump cavity 23. From there, it is forced out of external connection 24. FIG. 2 depicts a centrifugal pump. Various types of positive displacement pumps could be used instead.

While numerous powder metallurgy techniques may be used to produce laminated porous filter elements, the particularly preferred process is that described in copending, commonly assigned patent application Ser. No. 229,823, filed Feb. 28, 1972, now U.S. Pat. No. 3,864,124 which application is in turn a continuation-in-part of application Ser. No. 818,781, filed Apr. 23, 1969, now abandoned, the teachings of these applications being incorporated herein by reference in their entirety. This procedure has the advantage of utilizing a flexible, clothlike sheet of high green strength which can easily adapt itself, due to its drapeability and clothlike nature, to a variety of configurations not obtainable when using the relatively stiff sheets typical of the prior art (e.g., U.S. Pat. No. 3,581,902). The clothlike sheets preferred according to this invention generally comprise from about 85 to 99% by volume of a solid, particulate sinterable material such as metal, alloy, intermetallic compound, ceramic, salt, plastic or the like and mixtures thereof and about 1 to 15% by volume PTFE. According to the process described in said Ser. No. 229,823, PTFE powder such as sold by E. I. du Pont de Nemours & Co., Inc. under the trade name "Teflon 6C" is mixed dry with the sinterable particulate material, hereafter illustrated as metal powder, in a mill such as a ball mill that mechanically works the PTFE so as to enmesh the metal powder. Tumbling in a steel ball mill with ½-inch diameter steel balls for thirty minutes is adequate. The PTFE-metal powder mixture is distributed over a 1/16-inch thick stainless steel supporting plate, and the whole is passed through heated rolls set at ¼-inch spacing. The rolled powder is folded on itself, rotated 90°, and again passed through the rolls. This cross-rolling step is repeated until the sheet becomes clothlike and self-supporting. This normally occurs within four to eight passes. It is believed that the mechanical working which takes place in essentially the dry state (in the substantial absence of lubricants), fibrillates the PTFE and causes particle-to-particle bonding between the metal particles by means of the fibrils, fibrils actually adhering to the surfaces of the particles. The self-supporting sheet is then removed from the stainless steel plate and cross-rolled two or three times with the rolls set 3/16-inch apart. The thickness of the sheet is then reduced in steps of approximately 0.01 inch to that desired.

In order that the pore structure of the two different layers of the filter element be different, at least the particle size, nature or percent by volume of sinterable particles in the sheet preforms must differ. By selecting the desired variables(s), one can arrive at a predetermined pore size with routine experimentation well within the skill of the art. For example, preform sheets having the following compositions can be employed:

Sheet A. 95 volumes of −325 mesh type 316L stainless steel powder and 5 volumes of PTFE.

Sheet B. 68 volumes of −50 +80 mesh type 316L stainless steel powder, 17 volumes of stainless steel braze alloy powder, and 15 volumes of PTFE. Filtering elements in the form of disc shown in FIG. 1A were made by the following procedure.

1. To make the upper layer 12, a 2-inch diameter circle was cut from a filled sheet, 0.020-inch thick, of Sheet A.
2. An annulus of Sheet A having an outside dimension of 2 inches and an inside dimension of 1.8 inches, 0.050-inch thick, was cut and placed on the disc obtained in Step 1. Borosilicate adhesive was used to attach the annulus to the disc of Sheet A prepared in Step 1. This provided the outer seal.
3. The collection layer 13 was made from Sheet B, 0.050-inch thick, having an outer diameter of 1.8 inches. This disc was placed inside the circle formed by the annulus of composition A. Borosilicate adhesive was used to effect a temporary bond between discs A and B.
4. To make the lower layer 12, another disc 2 inches in diameter was cut from Sheet A, 0.020-inch thick. This was glued on top of the assembly previously described. After drying for one hour in air, the disc, supported on an 0.080-inch thick sheet of fibrous aluminum silicate ("Fiberfrax", made by The Carborundum Company, Niagara Falls, New York), were sintered at 2150° F. in hydrogen for two hours to achieve interparticle molecular bonding and to decompose and remove the PTFE. After they had cooled, a ½-inch hole was drilled in the center of the discs.

It will be immediately apparent to one skilled in the art that many variations of the described process may be employed and that other types of adhesives, if used, can be used temporarily to hold the elements prior to sintering. For example, mechanical clips, crimping and acrylic adhesives may be used to adhere the presintered elements.

In the separation of solids from liquids it is often necessary to allow smaller particles to pass through the filtering medium while retaining larger particles. When passing particles larger than 25 microns, it is advantageous to construct the filtering elements of screen, as shown in FIG. 3. In this construction, the outer layer 24 is screen having an opening of the largest size of particles that are to pass through the filter. This corresponds to processing layer 12 in FIG. 1. Corresponding to supporting and collecting layer 13 of FIG. 1 is layer 25 in FIG. 3. This can be a large-opening screen, corrugated metal, or a very large pore-size foamed metal. Its resistance to fluid flow should generally be less than one-half of that of layer 24. The outer seal 26 can be made by wrapping a strip of Sheet A around the periphery and pressing it into place. An adhesive may be necessary to keep it from falling off during handling. Sealing surface 27 is made by pressing a washer of composition A into the surface such that it is forced into the holes and recesses of layer 24. The top surface of the washer is made flat so that it can seal against gaskets 15 when used in the apparatus shown in FIG. 1. This assembly is then placed in a hydrogen furnace and heated to 2100° F. for two hours in order to sinter the porous metal particles together and metallurgically bond them to the screen.

It is sometimes necessary to filter particles having a particle size smaller than 1 micron in environment that would degrade organic filter media. Porous metal media made by sintering powdered metal for a long enough period at a high enough temperature to give good strength generally have pores larger than 5 microns and consequently are inappropriate for filtering the small particle sizes just referred to. To make porous metal filter elements having smaller pores for the practice of this invention, the filter medium shown in FIG. 4 may be used. The bottom layer 28 corresponds to layer 12 in FIG. 1. It is made by sintering metal powder as previously described. The overlay 29, having a thickness and pore size less than one-half those of layer 28, was made by the following procedure.

A 2-inch diameter filter element having the structure shown in FIG. 1A is mounted as shown in FIG. 1. Its outer layer was 0.020-inch stainless steel having a mean pore size of 6 microns and a maximum pore size of 30 microns. This filter element, rotating at 280 rpm, was lowered into an aqueous medium containing precipitated nickel hydroxide. Vacuum was then applied to the external connection. Filtration was allowed to continue until flow stopped, which took approximately 5 minutes. The filter element was removed from the assembly, washed to remove excess gelatinous precipitate that coated the surface, and heated at 2° per minute from room temperature up to 150° C. The element was then placed in a hydrogen furnace set at 600° C. for fifteen minutes. The result of this procedure was to produce a coating 0.002-inch thick with a maximum pore size of less than 2 microns.

Alternatively, nickel oxide can be used instead of the hydroxide. It is immediately apparent that other metals or alloys can be applied to the surface of porous metals in accord with the instant invention by first coating them with slurries of compounds or complexes of metals or mixtures of complexes and compounds (hereafter "metal-forming compounds"), followed by simple heating or hydrogen reduction of the compounds or complexes to reduce or decompose the compound or complex to form the desired porous metal overlay in situ, as depicted in FIG. 4. Suitable metal compounds include salts such as carbonates and halides while organic complexes such as citrates and oxalates may also be employed. Metals of Group I, III, IV, V, VI and VII are suitable. Hydrogen or cracked ammonia can be used for in situ conversion of such compounds and complexes to the corresponding metals such as chromium, molybdenum, tungsten, iron, gold, platinum, silver, copper, lead, cobalt, nickel, tin, and bismuth.

The slurry of metal-forming compounds may contain other agents as desired such as thickening agents, suspending agents, binder, and the like. Generally, it is preferred that these added agents decompose or be removed during the conversion of the metal-forming compounds to metal so that the resulting porous metal layer is essentially pure metal.

The application of a pressure gradient to direct the overlaid metal-forming compound particles into the pores of the parent filtering medium is considered an important means of locking the overlaid coating into the substrate. The pressure gradient also provides a basis for selectively closing pores larger than the mean pore size of the parent porous medium since oversize pores will be plugged by particles too large to enter smaller pores and will also be plugged sooner than smaller pores because more fluid passes through them.

There are other, less preferable, ways in which a coating of the type shown in FIG. 4 can be formed. One of these is simply to paint a slurry of a metal forming compound such as a hydroxide or very finely divided metal over the surface of a filter and mechanically work it partially into the pores. This normally will be done on presintered metal because the high temperatures involved in sintering of the porous metal would cause excessive sintering in the coating layer, which might make surface pores too large. Alternatively, a thickened solution of a metal salt can be painted onto the surface. The purpose in making it thick is to prevent penetration into the pores. To insure that this penetration does not occur, the pores in the filter can be prefilled with water before the coating is applied.

In another embodiment of the invention particularly where filtration of bacteria, smoke, and other particles of comparable size is contemplated, ultrafiltration membranes may overlay processing layer 12 of FIG. 1A. Such ultrafiltration membranes include those of PTFE, polyethylene, polypropylene, polycarbonate, silver, and glass and, per se, such membranes are well known in the art.

The filtering disc shown in FIG. 1A provides an excellent substrate for these membranes. Depending upon operating temperature and chemical environment, the material of construction of layers 12 and 13 in this embodiment may be metal, plastic, or ceramic. Selection can be based upon widely publicized properties of these materials.

The ultrafiltration membranes are used by attaching them to filtration layer 12. Silk-screening techniques can be used to apply an adhesive or braze pattern over the surface of 12. The coverage of adhesive should be minimized, preferably less than 25 percent of the area of layer 12.

The selection of the attaching agent is based upon the compositions of the membrane and layer 12. The epoxies, cyanoacrylates, silicones, and fluorinated ethylene-propylene adhesives are among the adhesives that can be used. For thin metal membranes, non-wicking braze alloys can be used for attachment. The periphery of the disc is sealed with the adhesive or braze.

A desirable material for an overlay in which the pore size must be smaller than that in the underlying distribution layer is one that has straight holes that run transversely to the plane of the overlay. It is also desirable to have a narrow pore-size range. Etched metal, screen, and some of the polymeric films have this geometry.

EXAMPLE 1

This example demonstrates the use of high frequency, periodic reverse flow coupled with rotary filtration to prevent cake buildup and plugging in hard-to-filter systems. The filtering element was a disc filter, two inches in diameter having the structure shown in FIG. 1A. Layers 12 were 0.020-inch thick porous stainless steel having a mean pore diameter of 6 microns. These were polished to present a smooth surface. It has been discovered in this and other tests that filtering elements with smooth surfaces are less prone to plug than those with rough surfaces. Layer 13 was 0.050-inch thick porous stainless steel having 98-micron pores. The fluid to be filtered was an industrial waste containing gelatinous heavy metal hydroxides. The filtering element was placed in the fluid and rotated at 1325 rpm under 10 cm of mercury vacuum. After 150 minutes of continuous operation without backpulsing or reverse flow, the filtering rate decreased to 50 percent of initial flow. The test was repeated using backpulsing according to the invention, namely 12 seconds of forward flow and 3 seconds of reverse flow. The run continued for 48 hours with less than 15 percent diminution of initial flow.

EXAMPLE 2

This example demonstrates that increasing the frequency of backpulsing increases the rate of filtration. A single disc mounted in the apparatus depicted in FIG. 1 was used. The disc, having the structure depicted in FIG. 1A, had 0.020-inch thick outer layers of porous stainless steel with 6-micron pores (mean pore diameter). In this test a smooth surface was essential for continuous operation. The center supporting and collecting layer 13 was 0.050-inch thick porous stainless steel with 98-micron pores (mean pore diameter). An industrial waste containing a relatively low concentration of gelatinous precipitate was used in this test. While the disc was rotated at 1325 rpm, nitrogen was periodically introduced into the egress line from the apparatus. This forced filtrate in the reverse direction through the rotating filter disc. Two sets of conditions were used. The first was 58 seconds of suction under a 10 cm Hg vacuum and 2 seconds of nitrogen pressure at 10 psi to cause reverse flow, giving a frequency of 60 pulses per hour. Next, the frequency of pulsing was doubled by applying suction for 29 seconds and backflowing for 1 second, giving 120 pulses per hour. In both tests the ratios of forward flow to back flow were 29 to 1. The results are tabulated below.

| | Rate of Collection of Filtrate (ml/min) | |
|---|---|---|
| Time (minutes) | 60 pulses/hour | 120 pulses/hour |
| 10 | 59 | 76 |
| 20 | 57 | 69 |
| 40 | 52 | 66 |
| 60 | 51 | 67 |

EXAMPLE 3

The disc with thin porous nickel overlay, shown in FIG. 4 and prepared as previously described, was remounted as shown in FIG. 1 and submerged in an industrial waste water containing small amounts of gelatinous precipitate resulting from treatment with lime. A vacuum of 10 cm of Hg was applied to the external connection. The filter was rotated at 1325 rpm. The flow rate through the filter after 380 minutes reached a constant value of 12 ml/min/in$^2$ of filtering area. By comparison, an untreated disc operated in the same manner had a flow rate of 1.6 ml/min/in$^2$ of filtering area after 160 minutes of operation.

EXAMPLE 4

This example demonstrates that the filters of the present invention will continuously remove gases from gas-solid mixtures.

Three discs mounted as depicted in FIG. 1 were used. The outer layer 12 was porous stainless steel in which the pores had a mean diameter of 3 microns. The surfaces were made smooth by brushing.

The filtering elements were inserted in a flue in a power generating plant that was carrying smokestack gases heavily laden with fly ash particles, ranging in size from smaller than 0.3 micron up to 100 microns. The mean particle size was 10 to 12 microns. When rotated at 2500 rpm, the filter under a pressure gradient continuously removed a sample for analysis for one week during which no plugging occurred. All particles, including those smaller than 0.3 micron, were intercepted by the filter, as determined by a downstream glass filter. When the speed of rotation was reduced to zero, the filter plugged in 40 minutes.

Another embodiment of the present invention is the operation of rotating laminated porous elements according to the invention in a backflow mode, that is, instead of removing fluid medium from the body of fluid medium in which the filter element is immersed, gas or liquid is dispersed into the body of fluid medium through the laminated porous elements. It has been discovered that when liquid or gas is caused to flow through the rotating porous elements from inside the tubular shaft 7 out through processing layers 12 (see FIG. 1), it was well dispersed in the surrounding fluid medium. The dispersing action, while it is obtainable with the disc configuration of FIG. 1, can be enhanced by using an impeller configuration of the design depicted in FIG. 5. This impeller is substituted for the filtering assembly 2 shown in FIG. 1. In operation, fluid (gas or liquid) flows into the interior 7 of shaft 1 while it is in operation. Flow continues down the shaft and out through slots 14 in FIG. 1 through openings 33 shown in FIG. 5A to the distribution layer 13 shown in FIG. 5A and FIG. 5B and hence out through outer layer 12. Layers 13 and 12 are attached to the impeller blade 30. These impeller blades which may be flat or curved are attached to hub 31 by means of welds 34. The direction and speed of rotation and the pitch (e.g., at an angle of 10°) of impeller blades are selected to produce high shear and turbulence at surface 12. High interfacial contact is rapidly generated by the interaction of fluid egressing through surface 12 under a pressure gradient with the ambient fluid being pumped over the surface by the pitch of the blades.

In the impeller or propeller dispersing mode of the invention, the advantages are twofold, the fluid medium into which gas or liquid is dispersed is subjected to a pushing or pumping action by the pitched blades and the fluid medium rapidly flows over the active porous dispersing surfaces. The blades, or at least a portion thereof, are normally pitched or angled from the plane of rotation and up to an angle such that the dispersing surface is parallel to the axis of rotation. For example, the angle may be between about five degrees from the plane of rotation and the axis of rotation. This causes, during rotation, a force to be exerted on at least a portion of the dispersing surface by the fluid medium which force has a component normal to that surface. Gas or liquid dispersed from the device does not remian in the immediate area of the device but rather is rapidly removed from the area while fresh fluid medium is brought into the area by the action of the rotating blades. Moreover, the angle of the blades causes the fluid medium to pass over the active surfaces with a higher velocity. As will be apparent to one skilled in the art, only a portion of the blades need be pitched and the angle of pitch may differ at various parts of the same blade such as by providing a curved blade (see FIG. 5).

The flow of gas or liquid through the device of the invention into the body of fluid medium may be constant, or, where small bubble size is desired, the flow may be pulsed at predetermined and relatively rapid intervals.

Although in FIG. 5 porous processing layer 5 is depicted as the leading surface of the impeller, it is apparent that the arrangement of layers can be reversed whereby porous processing layer 5 becomes the trailing surface on some or all of the blades of the impeller.

The size of suspended bubbles and drops dispersed into the fluid medium is believed to result from competing rate processes, the competition taking place between the rate of growth and the rate of diminution of size. The hindered state is characterized by a high incidence of bubbles or drops such that the bubbles or drops interfere with each other when in motion. Growth of the bubbles results from contact and coalescence of individual bubbles, for example, which is influenced by such a factor as interfacial tension between a drop or bubble of fluid and its suspending fluid. Diminution in bubble size results from shear and impact forces applied mechanically due to turbulence and cavitation. Thus, small equilibrium bubble size is favored by the device of the present invention wherein small pore openings at the dispersing surfaces exposed to high mechanical rates of shear permit the formation of small bubbles or droplets which persist due to turbulence until coalescence becomes a dominating factor in their growth.

Known devices for dispersing gases into liquids having rotating members are illustrated by U.S. Pat. Nos. 1,124,855, 2,825,542, 3,650,513, and 3,782,702. Gas to be dispersed in a liquid is typically jetted from the tips of propeller blades revolving about a hollow shaft to form large bubbles which are reduced in size by turbulence at the tips of the blades. Various configurations of hollow discs having patterns of porosity have also been employed for dispersing gas into liquids.

A primary problem with these prior means for mechanical sparging is that the bubble size of the introduced gas is too large, which reduces the interfacial area between the gas being sparged and the liquid into which the gas is being dispersed. To reduce bubble size, it has previously been proposed that the gases to be dispersed should first be dissolved in liquids at elevated pressures and then converted into bubbles by reducing pressures. This requires complicated equipment and is not amenable to sparging very large quantities of liquid such as those processed in municipal waste treatment plants.

Existing means for dispersing liquids into liquids vary from simple mixing to colloidal mills in which liquids being emulsified are subjected to high shear by passing them between a rotating surface and a stationary surface. They require large amounts of energy. Ultrasonic energy is also used for making emulsions. These techniques are described in the Kirk-Othmer Encyclopedia of Chemical Technology; 2nd ed., Vol. 8, Interscience Publishers, New York, 1965, pp. 117–154.

The rotating disperser of this invention may comprise blades of the marine propeller type such as screw propellers and flat-surfaced, pitched-bladed impellers both for moving bodies of fluid and imparting turbulence thereto. Also included are slow-moving, flat-bladed impellers such as used to give motion to sludge in the bottom of tanks used in the treatment of sewage. Pitch of blades can vary from the horizontal by from 5° to 95°.

Bubble size can be further reduced by means of ridges that are transverse to the direction of flow. Ridges were formed on the blade described above by laying strips of porous stainless steel 0.030-inch wide by 0.020-inch thick 0.10-inch apart on the porous surface of the blade and sintering the assembly to effect bonding.

When ridged and unridged impellers were rotated at 780 rpm, the bubble size from the impeller with ridges was smaller than that from the impeller without ridges as indicated by the rate at which the bubbles rose.

As the liquid passes over the blade, these ridges create turbulent flow which removes bubbles from the surface before they have a chance to coalesce. Depending upon the speed of rotation, angle of blade, and viscosity of the liquid, the spacing, height, orientation, and shape of ridges are adjusted in accordance with the principles of fluid dynamics to provide maximum turbulent flow at the surface from which the gas is being emitted. Other projections above the surface can replace ridges.

Reduction of bubble size of gas (or liquids) through prevention of coalescence can also be effected by isolating the egress openings in the sparging surface. For example, the porous metal surface can be masked with an impervious barrier that would allow gas to egress through one or more lines perpendicular to the direction of flow of fluid over the impeller blades. Or, the mask could allow gas to egress from points situated to prevent coalescence. The width of open lines or diameter of circular openings should be less than 100 microns in order to obtain small bubbles. The lines or circular openings should be spaced over 200 microns apart in order to avoid coalescence.

The procedure used to make the impeller shown in FIG. 5 is similar to that used to fabricate the circular elements 11 and 11a shown in FIG. 1. FIGS. 6 and 6A show more details of construction of a typical porous bladed impeller. This Figure depicts an impeller that is made to fit onto the assembly shown in FIG. 1 in place of the filtering element 2. The construction of impeller blades is shown in Section 6A—6A. The distribution layer 40 is sandwiched between a supporting plate 39 and an outer layer having smaller pores 41. The hollow shaft 37 supports the impeller blade and also provides a fluid connection between layer 41 and the interior of the hub. Holes 42 connect the interior of 37 to the distribution layer 40. The shaft 37 is welded to supporting plate 39. The impeller blade is constructed by gluing a 0.020-inch thick piece of Sheet A on top of a 0.050-inch thick piece of Sheet B, using a non-wicking braze alloy such as that described in copending, commonly assigned U.S. Pat. application Ser. No. 402,331. Sheet B is undercut as shown in FIGS. 6 and 6A, and Sheet A is overlapped to make the resistance to flow from the edges equal to that from the surface of 41. The assembly is placed into a hydrogen furnace and heated to effect a braze between layer 40 and supporting plate 39 and between layers 40 and 41. The thickness of layer 40 and the number of holes 42 are adjusted to achieve uniform flow out of 41. Additional distribution channels connected to hollow shaft 37 can be added in order to obtain uniform flow out of surface 41 for very large impellers. The design of the distribution system to layer 40 can be based upon principles of fluid flow that are part of chemical engineering technology. The impeller blade is attached to hub 35 by welding. In the dispersing cycle fluid comes down through the hub as it is rotating and flows out through the interior of hollow shaft 37 through holes 42 into the distribution layer 40 and thence out layer 41. In the filtration mode, the direction of flow is reversed.

EXAMPLE 5

This example demonstrates the superior sparging ability of the device of this invention. The apparatus used is shown in FIG. 1 except that an impeller of the construction shown in FIG. 6 was used in place of filter assembly 2. It was made entirely of 316 stainless steel. Each blade was ½-inch wide by 2 inches long. The mean pore size of the outer layer 41 was 6 microns. In the first test, the impeller was submerged in a 10-gallon glass tank filled with water containing less than 0.01 percent Triton X-100 surface active agent. The device was caused to rotate at 800 rpm. Air was forced, at a rate of 5 liters per minute, in through external connection 6 whence it passed through ingress ports 9, down the hollow shaft 1 to hub 35 and out through distribution layer 41 and surface layer 40. After sparging had been carried out for 10 seconds, the water was completely full of tiny air bubbles. In the second test, air was passed at the same flow rate through a conventional stainless steel sparger into an identical tank containing water with the same concentration of Triton X-100 as in test number one while the water was mechanically stirred at the same rpm. Many fewer and much larger bubbles resulted after 10 seconds in the second test.

Increased turbulence and therefore smaller bubble size can be accomplished by the provision of ridges or other projections above the porous surfaces. These can be spaced as desired and in any number and shape as desired, the result being to increase turbulence of the fluid medium in the immediate area of the rotating device to reduce the chances of bubble contact and increase in bubble size.

EXAMPLE 6

This example demonstrates that the device of this invention is an effective means for producing emulsions. The apparatus used in this example is described in Example 5. The impeller was submerged in a 10-gallon glass tank filled with water. Kerosene was forced at a pressure of 2 lbs./sq. in. through external connection 6 while the impeller was rotating at 1,000 rpm. After 4 minutes of operation the kerosene was dispersed in the water in the form of small droplets. It required 16 hours before the dispersion separated into two layers.

This excellent dispersive action is attributed to the rapid shearing into small droplets of the kerosene as it emerged from the porous surfaces of the impeller blades.

This means of making emulsions should produce better emulsions at lower energy costs in the fields of foods, agricultural chemicals, cosmetics, and industrial chemicals.

EXAMPLE 7

This example demonstrates that the device of the present invention is an effective means of generating foam needed for foam separation.

The device described in Example 5 was submerged in a 2-gallon tank containing water in which were dissolved organics that had a chemical oxygen demand of 200,000 ppm oxygen. Ten drops of a surface active agent (Triton X-100) were added. Air was forced into the external connection 6 at a pressure of 400 mm of Hg. As foam collected on the surface of the water, it was mechanically removed. After 4 minutes of operation, the chemical oxygen demand in the solution was reduced to 50,000 ppm oxygen.

This means of generating foam is useful for purifying water containing dissolved organics. This is a major problem in waste waters from refineries, car washes, food processing plants, and many chemical processes. It is also an effective means for generating foams for the removal of solids from liquid-solid mixtures such as ore flotation.

EXAMPLE 8

This example demonstrates that gas being emitted from the surface of a propeller made in accordance with the present invention reduces friction with its liquid environment.

The device described in Example 5 was submerged in a 5-gallon container of water. The external connection 6 was joined to a source of nitrogen. The device was connected at core plug 2 to a 1/50 horsepower motor whose free rotational speed is 1800 rpm. The rpm of the impeller was measured as a function of air flow through the impeller. The speed of rotation increased from 1250 rpm at no gas flow up to 1310 rpm at 1.7 liters per minute nitrogen. This indicates that the gas being emitted from the surface of the impeller reduced its frictional drag in the water.

This device will thus have utility, inter alia, for reducing the power needed to drive boat propellers.

The rotary filter-dispersers of this invention have numerous practical uses. In the filtration mode they can be used for removing samples free of solids from waste and process streams for analysis. Closely related to this application is its use for sewage treatment wherein the addition of chemicals used in the process is continuously controlled on the basis of samples continuously removed from sludges. Such heavy concentration of solids interferes with normal sampling probes. It can be used for sampling gas streams containing dispersed particles. In addition to sampling smokestack emissions, it can be used for sampling gases, fluidized-bed reactors, and various industrial processes. The rotating filter is also valuable for large-scale separation of solids from liquid or gases. Some suspended catalyst reactors need the rotary filter of this invention for the continuous removal of reaction products. The filter can be used for continuously removing liquids from solids being washed with the liquid medium.

Operation of the filter in the backflow mode for dispersing opens up many other possible applications. One large class is efficient dispersion of chlorine, ozone, air, and other gases into waste streams being purified. Closely related are industrial processes involving reactions between liquids and gases.

The efficiency of flotation separation of small particles is increased by the use of small bubbles. The device of this invention efficiently produces high concentrations of small bubbles.

Emulsification is another large potential use for this device in the fields of food processing, pharmaceuticals, cosmetics, paints, and other industries making liquid-liquid dispersions.

Still another use for the rotary disperser is for extremely rapid mixing of two reactants in order to prevent excessive localized concentrations that could lead to unwanted side reactions or temperature rises.

What we claim is:

1. A fluid processing apparatus for filtering suspended matter from fluid medium comprising:
    a hollow shaft,
    a fluid processing device mounted on one end of said shaft comprising at least one porous element having an outer porous processing layer and an inner porous supporting and distributing layer, said porous layers having relatively large planar surfaces joined by smaller edge surfaces, said layers being contacted and bonded over one of their large planar surfaces, the pores in said layers being in open communication over substantially all of the interface of the contacting surfaces so that fluid medium can pass from one layer to the other, the pores in the outer processing layer being smaller than the pores in the inner supporting and distributing layer, the outer porous processing layer being formed from sintered particulate material and having a smooth outer surface, said porous element being mounted on a means for attaching the porous element to the hollow shaft so that fluid medium can pass from the interior of the porous element to the interior of the hollow shaft, said inner supporting and distributing layer being confined within the porous element so that when the porous element is immersed in a body of fluid medium, the supporting and distributing layer communicates with the body of fluid medium only through the outer processing layer, a means for imparting rotary motion to the hollow shaft and fluid processing device during the filtering operation, a conduit providing a fluid path between the interior and the exterior of the hollow shaft at a point remote from the point of attachment of the fluid processing device to the hollow shaft, thereby providing a continuous fluid path from the exterior of the fluid processing device, through the processing layer, through the inner supporting and distributing layer, through the hollow shaft and through the conduit to a point remote from the fluid processing device, a means for applying a pressure differential to the conduit during the filtering operation to cause a flow of fluid medium from the exterior of the fluid processing device, through the processing layer, through the inner supporting and distributing layer, through the hollow shaft and through the conduit, and a means for periodically reversing the pressure differential during the filtering operation thereby reversing the flow of fluid medium at a rate in excess of ten times per hour and sufficient to reduce the tendency for suspended matter being filtered to collect on and in the porous processing layer.

2. The apparatus according to claim 1 wherein the fluid processing device comprises:

a central hub adapted for mounting on the hollow shaft, at least one of the porous elements projecting outwardly from said hub and having a relative large planar porous surface providing a continuous fluid path from the exterior of the porous surface through the outer porous processing layer, through the inner porous supporting and distributing layer and to the interior of the hollow shaft through the central hub, a second element projecting outwards from said hub having a relatively large planar surface essentially coextensive with an opposed planar surface of the porous element, the planar surfaces of the two elements being spaced apart a predetermined distance such that when the device is rotated in a body of fluid medium and a pressure differential is applied to the device to cause fluid medium to pass from the exterior to the interior of the porous element, centrifugal force prevents particles of suspended matter to be filtered from the fluid medium from entering the space between the planar surfaces.

3. The apparatus according to claim 2 wherein in the fluid processing device, the second element is a porous element providing a fluid path from its exterior through its interior to the interior of the hollow shaft through the central hub, the opposed planar surfaces of the first and second elements are porous and the first and second elements are each continuous around the hub with the hub lying essentially in the center of each element.

4. The apparatus according to claim 1 wherein the fluid processing device comprises:

a central hub adapted for mounting on the hollow shaft, a first and second of the porous elements each projecting outwards from said hub, each having relatively large planar surfaces, said first and second elements each being comprised of at least three layers, the first layer being an impervious supporting layer, the second layer being the porous processing layer formed from sintered particulate material and having smooth outer surfaces, and the third layer, lying intermediate the first and second layer and open to the interior of the central hub, being the porous collecting and distributing layer the pores of which are larger than the pores in the processing layer, said layers being contacted and bonded together, the pores in the bonded surfaces of the second and third porous layers being in open communication over substantially all of the interface of the contacting surfaces to permit fluid medium to pass from one layer to another, the third layer being confined within each of the elements so that when the device is immersed in a body of fluid medium, the supporting and distributing layer communicates with the body of the fluid medium only through the processing layer, and each element having at least a portion of its planar surfaces lying at an angle from parallel to the axis of rotation to about 5° from the plane of rotation of the device whereby when the device is rotated in the body of fluid medium to be filtered, the fluid medium exerts a force on the angled surface having a component of force normal to said surface.

5. The apparatus according to claim 1 wherein both of the porous processing and porous supporting and distributing layers are made of sintered metal particles.

6. The apparatus according to claim 5 wherein the porous layers are metallurgically bonded together.

7. The apparatus according to claim 1 wherein the means for periodically reversing the flow of fluid medium achieves a ratio of flow of fluid medium from the exterior of the fluid processing device, through the processing layer, through the inner supporting and distributing layer, through the hollow shaft and through the conduit to flow of fluid medium in the opposite direction of from between 100 to 1 to 1.5 to 1.

8. A fluid processing apparatus for introducing fluid medium into a body of fluid medium of different constitution comprising:

a hollow shaft, a fluid processing device in the form of an impeller mounted on one end of said shaft comprising:

a central hub adapted for attachment to the hollow shaft, a first and second element each projecting outwards from said hub, each having relatively large planar surfaces, said first and second elements each being comprised of at least three layers, the first layer being an impervious supporting layer, the second layer being a porous processing layer and the third layer, lying intermediate the first and second layer and open to the interior of the central hub, being a porous collecting and distributing layer the pores of which are larger than the pores in the processing layer, said second and third layers being formed from sintered particulate material, said layers being contacted and bonded together, the pores in the bonded surfaces of the second and third porous layers being in open communication over substantially all of the interface of the contacting surfaces to permit fluid medium to pass from one layer to another, the third layer being confined within each of the elements so that when the device is immersed in a body of fluid medium, the supporting and distributing layer communicates with the body of the fluid medium only through the processing layer, and each element having at least a portion of its planar surfaces lying at an angle from parallel to the axis of rotation to about 5° from the plane of rotation of the device whereby when the device is rotated in the body of fluid medium, the fluid medium exerts a force on the angled surface having a component of force normal to said surface.

9. The fluid processing apparatus according to claim 8 wherein the first and second elements are formed of metal and a portion of the pores of the exterior surface of the processing layer is blocked in a predetermined pattern, thereby preventing the passage of fluid medium in the blocked areas.

10. A fluid processing device adapted for attachment to a rotatable hollow shaft while providing a continuous path for fluid medium between the interior of the fluid processing device and the interior of the hollow shaft comprising:

a central hub adapted for attachment to the hollow shaft, a first and second element each projecting outwards from said hub, each having relatively large planar surfaces, said first and second elements each being comprised of at least three layers, the first layer being an impervious supporting layer, the second layer being a porous processing layer and the third layer, lying intermediate the first and second layer and open to the interior of the central hub, being a porous collecting and distributing layer the pores of which are larger than the pores in the processing layer, said second and third layers being formed from sintered particulate material, said layers being contacted and bonded together, the pores in the bonded surfaces of the second and third porous layers being in open communication over substantially all of the interface of the contacting surfaces to permit fluid medium to pass from one layer to another, the third layer being confined within each of the elements so that when the device is immersed in a body of fluid medium, the supporting and distributing layer communicates with the body of the fluid medium only through the processing layer, and each element having at least a portion of its planar surfaces lying at an angle from parallel to the axis of rotation to about 5° from the plane of rotation of the device whereby when the device is rotated in the body of fluid medium, the fluid medium exerts a force on the angled surface having a component of force normal to said surface.

* * * * *